Aug. 24, 1965  J. GESMAR  3,201,893
INSECT TRAP
Filed Sept. 3, 1963  2 Sheets-Sheet 1
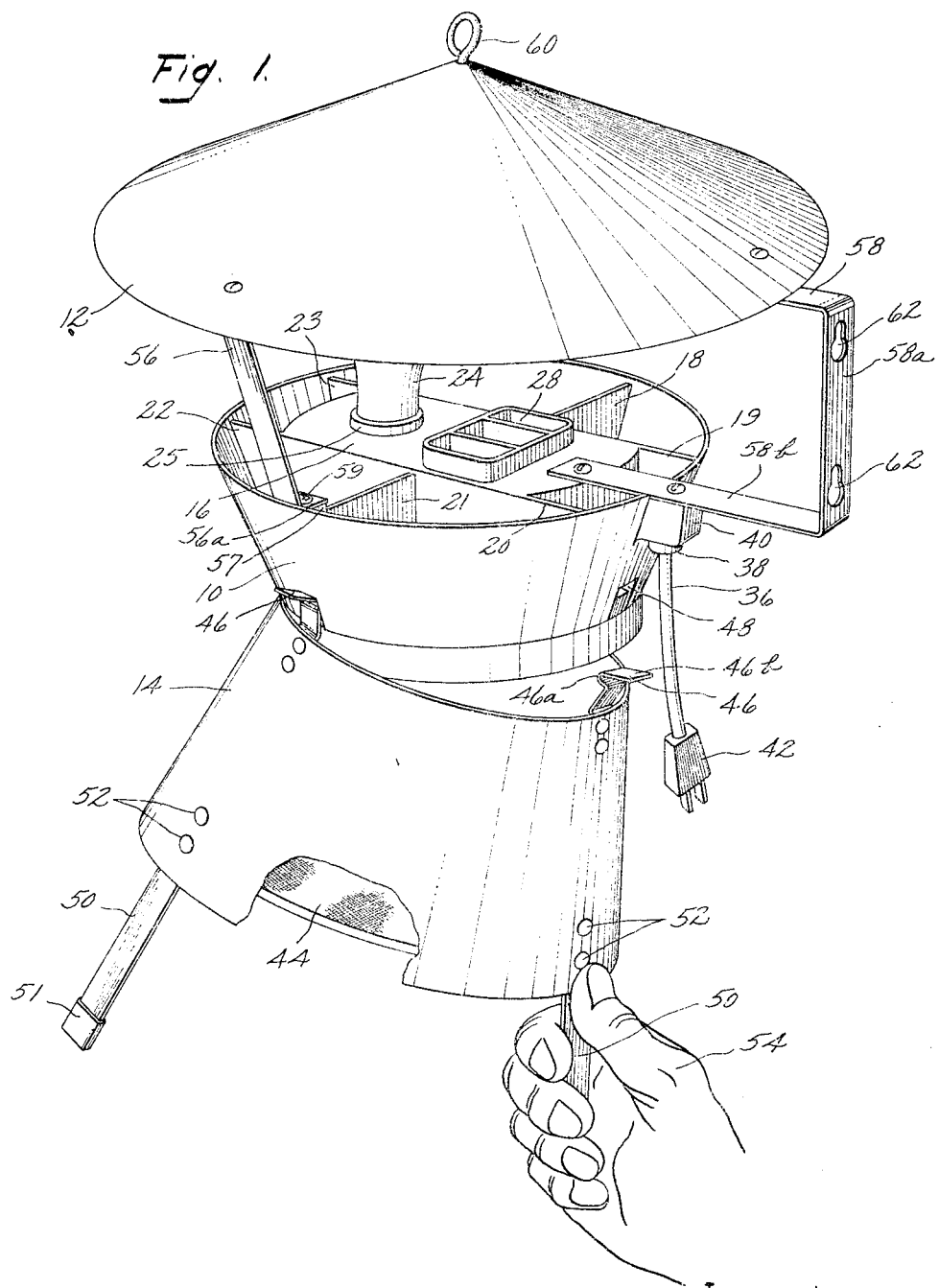
Inventor:
Jorgen Gesmar:
by Laurence R. Krumpton
His Attorney

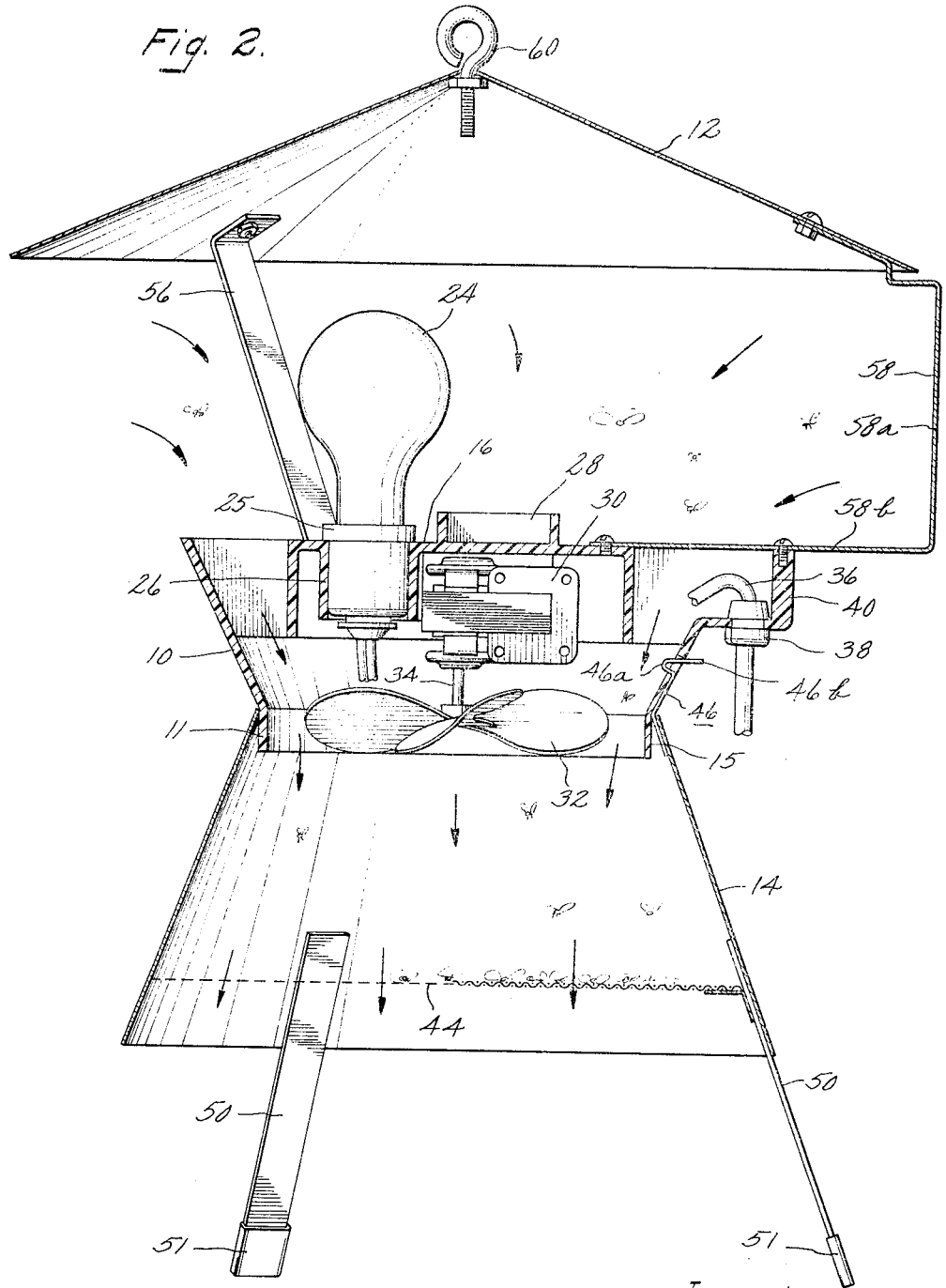

United States Patent Office 3,201,893
Patented Aug. 24, 1965

3,201,893
INSECT TRAP
Jorgen Gesmar, Westport, Conn., assignor to General
Electric Company, a corporation of New York
Filed Sept. 3, 1963, Ser. No. 306,034
2 Claims. (Cl. 43—139)

This invention relates to a device for attracting and capturing flying insects and is particularly adapted for use at night.

Although insect traps including a light for attracting the insects and a fan for drawing the insects into a container have been known for many years, they have never became widely accepted or commonly used as a household appliance. In order to gain such acceptance, it is highly desirable that a trap not only be effective in capturing insects, but in addition be low in cost and convenient to use.

It is a general object of this invention to provide an improved insect trap having an efficient and simplified low cost construction which is easy to fabricate and assemble.

It is another object of this invention to provide a lightweight insect trap having an improved arrangement for conveniently handling the trap to dispose of the insects accumulated in the trap.

Briefly stated, one embodiment of the improved insect trap of the invention includes a component supporting member which fits within the upper open end of an insect receptacle. The component supporting member carries means for attracting insects, such as an electric lamp, and an electric fan for drawing the attracted insects through the component supporting member and into the receptacle. For permitting the necessary airflow, a receptacle wall is formed of screening or similar material so that air may be drawn therethrough while insects will be retained within the receptacle. For ease of handling the insect trap and for supporting the trap, there is provided a plurality of legs attached to the receptacle. These legs are of a size such that the receptacle may be easily separated from the component supporting member by grasping one of the legs in one hand and the remainder of the trap in the other hand. In this manner the insects which accumulate within the receptacle may be conveniently and quickly disposed of by simply emptying the insects out of the open end of the receptacle.

Further features, objects and advantages will become apparent with reference to the following description and drawings in which:

FIG. 1 is a perspective view of an insect trap of the invention with the insect receiving receptacle partially separated from the remainder of the trap; and FIG. 2 is a side elevational cross-sectional view of the trap of FIG. 1.

Referring now to the drawings, the insect trap of the invention may be seen as including a component supporting member 10 connected to a hood or cover 12 and positioned over an insect receptacle 14. A supporting bridge 16 is centrally positioned within the supporting member 10 by means of a plurality of inwardly extending ribs 18-23.

For attracting insects at night, there is provided an electric lamp 24 mounted within an insulated socket 25 which in turn is positioned in a socket or recess 26 formed in the upper surface of bridge 16. As an additional means for attracting insects there is provided a series of compartments or recesses 28 also integrally formed in the upper surface of bridge 16 adjacent lamp 24. Attached to the lower surface of the supporting bridge, concealed from view, is an electric motor 30 having a fan 32 mounted on the motor output shaft 34. Any suitable attaching means may be employed. Electric power is provided for the lamp and the motor by means of a suitable cord 36 extending through a strain relief member 38 mounted in an outwardly extending enlarged portion 40 of support member 10. A suitable electric plug 42 is mounted on the end of cord 36. It should be noted that only a short length of cord 36 extends beyond the strain relief member 38. In this manner, plug 42 remains suspended in the air so that an electric connection made with the plug will also be suspended thereby minimizing the danger of electrical leakage.

One of the unique features of the insect trap of the invention is that all components are supported by the member 10. Moreover, the supporting member 10 is preferably molded of plastic and formed integrally with the central supporting bridge 16 and the ribs 18–23. Such an arrangement provides the necessary strength but yet is very inexpensive to fabricate in that it can be molded in one operation. The lamp 24 and motor 30 are individually electrically insulated from support member 10, and by utilizing plastic for the support member, the electrical components are doubly insulated from the remaining structure of the trap.

The compactness of supporting member 10 and its attached components should also be noted. The height of the member is approximately equal to the height of the motor fan combination with the fan positioned within the cylindrical orifice section 11 and with the motor positioned immediately beneath the upper wall of bridge 16. By positioning the lamp 24 adjacent the motor, no additional height is required.

In addition to supporting the aforementioned components, the support member 10 serves as an airflow passage having an inlet and an outlet orifice for fan 32. For this reason, the member has been given a frusto-conical shape vertically oriented with the larger end extending upwardly to form the top and the lower end extending downwardly to form the bottom. The lower portion 11 of the member 10 has a cylindrical shape which forms an outlet orifice for the fan and also provides stability to the unit when this cylindrical portion is inserted within the upper end of receptacle 14.

As can be seen from the drawings, the insect receptacle 14 is also provided with a frusto-conical shape but is oppositely positioned with respect to the supporting member 10. That is, the smaller end of the receptacle 14 extends upwardly, and the larger end forms the bottom. As explained, the lower cylindrical section 11 of the component supporting member 10 fits within the open upper end of the receptacle 14 so that the lower conical surface of the member 10 rests upon the upper edge of the receptacle 14. To retain the insects within the receptacle, a bottom wall 44 made of screening or similar material is provided so that air is permitted to flow through the receptacle while the insects are prevented from escaping. In this connection, it should be noted that since the cylindrical section 11 extends into receptacle 14, a pocket 15 is formed by the outer surface of section 11 and the inner upper surface of the side walls of the receptacle. This pocket prevents the insects from crawling upwardly out of the receptacle.

Since the insects accumulate in the receptacle when the trap is in operation, it is of course necessary to periodically dispose the accumulated insects. In accordance with the invention, there is provided a unique and convenient arrangement for such disposal operation. As a part of such arrangement, the receptacle 14 is releasably attached to the supporting member 10. For this purpose, there is provided three equally spaced flexible fingers 46 riveted or otherwise attached to the upper side wall of the receptacle. The component supporting member 10 is provided with three equally spaced apertures 48 positioned immediately above the cylindrical section 11 with each being aligned with a respective one of the fingers 46. It will be apparent that each of the flexible fingers 46 is self-biased such that its mid portion 46a will extend inwardly through the aperture 48 while the upper edge 46b of the finger will remain outside of the supporting member, as best seen in FIG. 2. The attaching force introduced by the fingers 46 is such that the receptacle will remain attached to the supporting member 10 when the trap is lifted from above but yet the receptacle can be easily separated from the supporting member by manually forcing or pulling the two components apart.

The other aspect of the easy disposal arrangement of the trap involves the three elongated elements or legs 50 having their upper ends attached by suitable fastening means 52 to the side wall of receptacle 14. The legs 50 are of a size such that the portion extending downwardly beneath the receptacle can be conveniently grasped by one hand as indicated by the hand 54 in FIG. 1. With such an arrangement, the receptacle can be easily separated from the remainder of the insect trap by simply pulling on the leg and forcing the fingers 46 from their mating apertures 48. The accumulated insects can then simply be removed from the receptacle by dumping the insects out of the open top. The reassembly operation is equally simple in that the receptacle can be easily pressed into its original position. While the receptacle may be made of the material desired, it is preferable that it be fairly strong and rugged so that it can be safely banged against a trash can to empty the trapped insects. By using a material relatively heavy when compared with the upper section of the trap, the stability of the appliance is enhanced. If metal legs are employed, non-scratching feet 51 may be provided for the ends of the legs 50 to protect the supporting surface.

The hood or cover 12 as seen from the drawings, is a cone-shaped member attached to the upper ends of a plurality of struts, including two plain struts 56 and a special strut and mounting member 58. The cover 12 performs several different functions. It protects the electrical components by preventing rain from falling thereon. It cooperates with the upper edge of member 10 to define the air inlet to the trap, and the size of the inlet determines the air velocity at the inlet. Since the insects normally approach from the sides, it is desirable that the cover be employed to obtain the 360° side inlet while preventing airflow from above. The cover also confines the light output of lamp 24 so that an unpleasant glare to people above the trap is prevented. In this regard, the inner lower surface of the cover 12 may be given a reflective finish to reflect light through the inlet, thereby intensifying the light output.

The cover and its associated strut also provide means by which the trap can be optionally supported by mounting on a vertical surface or be suspended from a support. A suitable member such as an eye-bolt or hook 60 extends through an opening in the upper tip of cover 12 to provide an attaching point for suspending or carrying the trap. The lower ends of struts 56 are bent inwardly at 56a and attached to lugs 57 extending inwardly from the side walls of support member 10, by means of screws 59 or other suitable fastening member.

As can be seen from the drawings, strut 58 has a specially designed configuration to perform combined functions. A vertical portion 58a of strut 58 is provided with a pair of keyhole slots 62 adapted to receive a pair of screws or nails extending from a vertical wall or similar surface. The vertical portion 58a also serves as a convenient handle for carrying the trap. It is particularly useful as a handle during the receptacle emptying operation in that the upper portion of the trap can be held by the handle with one hand while the receptacle is being held by grasping one of the legs 50 with the other hand. Since strut 58 may receive more stress than strut 56, it is connected to the supporting member 10 in a somewhat different fashion. The strut 58 is provided with a horizontally extending portion 58b and is aligned with the projection 40 of the supporting member 10 so that horizontal portion 58b may be connected to the supporting member by a suitable fastening member extending into projection 40 and another suitable fastening member extending into the central supporting bridge 16. For appearance reasons, the strut 58 is positioned opposite from the lamp 24 to balance the asymmetrical positioning of the two elements.

In view of the foregoing description, it will be obvious that in operation, air is drawn in by the fan through the inlet defined by the cover 12, the upper end of the supporting member 10; and insects attracted to the trap by the lamp 24 or by bait positioned in the compartment 28 are drawn into the air stream and collected in the receptacle 14. It should be noted that air can enter the trap throughout a 360° inlet and that the lamp 24 is also exposed throughout the entire inlet. A feature of the trap which is perhaps not so obvious is that the fan introduces a circular component to the airflow; thus insects drawn into the member 10 will strike one of the ribs 18–23 if not immediately drawn into the receptacle 14. This action is likely to stun the insect so that it is then sucked into the receptacle and escape is thereby prevented.

The advantages obtained by utilizing the frusto-conical shapes for the supporting member and the receptacle may also not be readily apparent. The converging arrangement of the member 10 provides maximum air velocity at the entrance to the receptacle 14. This is desirable from a standpoint of quickly drawing the insects into the receptacle. The diverging walls of the receptacle act as a diffuser section wherein the velocity of the air is smoothly decreased. Such an arrangement improves the efficiency of the air moving system and further desirably reduces air movement within the receptacle.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as set forth in the appended claims.

What is claimed is:

1. An insect trap comprising: an open-ended frusto-conical member defining an air passage through its open ends, said member being vertically oriented so that the small end forms the bottom and the larger end forms the top; a component supporting bridge positioned within said member; a plurality of supporting ribs extending between said member and said bridge; an electric lamp mounted in the upper surface of said bridge; an electric motor and fan combination attached to and extending beneath said bridge; a compartment for receiving insect bait formed in the upper surface of said bridge; an insect receptacle having a frusto-conical shape with its smaller end open and its larger end having a surface for permitting air to flow therethrough while preventing insects to flow therethrough, said receptacle being vertically oriented with the smaller end forming the top and the larger end forming the bottom, said receptacle top opening being slightly larger than the bottom of said member so that said member may be received within the top of said receptacle, a plurality of resilient fingers each having its lower end attached to the side wall of said receptacle and extending upwardly toward said member, each of said fingers having a middle section extending inwardly and each of said fingers being self-biased inwardly; a plurality of apertures formed in said member with each of said apertures being aligned with a respective one of said resilient fingers and each being adapted to receive a middle section of a respective one of said fingers for releasably attaching the receptacle to the member; and a plurality of legs attached to said receptacle, said legs being of a size to be conveniently grasped with one hand so that the receptacle may be separated from said member by grasping one of said legs and manually forcing the receptacle away from the member.

2. An insect trap comprising: an open-ended support member having an upper section of frusto-conical shape with the larger end extending upwardly and having a lower cylindrically shaped orifice section; a component supporting bridge positioned within the upper section of said member; a plurality of supporting ribs extending between said member and said bridge; insect attracting means mounted on said bridge adjacent the open upper end of said support member; an electric motor and fan combination attached to and extending beneath said bridge with the fan located at least partially within said cylindrical orifice section and arranged to draw air downwardly through said member; an insect receiving receptacle having a frusto-conical shape with its smaller end open and having a surface for permitting air to flow therethrough while preventing insects to flow therethrough; said receptacle being vertically oriented with the smaller end extending upwardly and the larger end extending downwardly, said receptacle upper end being slightly larger than said cylindrical section of said support member so that said member may be partially received within the upper end of said receptacle; means formed on the lower end of said support member and the upper end of said receptacle for releasably attaching the receptacle to the support member; and a plurality of legs attached to said receptacle extending downwardly to support said trap, said legs being of a size to be conveniently grasped with one hand so that the receptacle may be separated from said member by grasping one of said legs and manually forcing the receptacle away from the member.

References Cited by the Examiner

UNITED STATES PATENTS

| | | | |
|---|---|---|---|
| 988,476 | 4/11 | La Baum | 43—113 |
| 1,144,508 | 6/15 | Taylor | 240—2 |
| 1,601,552 | 9/26 | Bell | 43—113 |
| 3,059,373 | 10/62 | Gardner | 43—113 |

FOREIGN PATENTS

| | | |
|---|---|---|
| 631,512 | 11/61 | Canada. |
| 662,897 | 12/51 | Great Britain. |
| 358,817 | 5/38 | Italy. |

SAMUEL KOREN, *Primary Examiner.*